United States Patent
Jennings et al.

(10) Patent No.: US 6,854,940 B2
(45) Date of Patent: Feb. 15, 2005

(54) CLOSED-END BLIND RIVET WITH A CRIMPED SHANK AND METHOD OF MANUFACTURE THEREOF

(75) Inventors: Gary Jennings, Birmingham (GB); Peter C. Probert, Birmingham (GB)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/176,860

(22) Filed: Jun. 21, 2002

(65) Prior Publication Data

US 2002/0154963 A1 Oct. 24, 2002

Related U.S. Application Data

(63) Continuation-in-part of application No. 09/823,644, filed on Nov. 27, 2000, now abandoned.

(51) Int. Cl.[7] .................................. F16B 13/04
(52) U.S. Cl. ........................... 411/38; 411/43
(58) Field of Search ............... 411/43, 38, 34, 411/45–48, 42

(56) References Cited

U.S. PATENT DOCUMENTS

| | | | | |
|---|---|---|---|---|
| 2,324,142 A | * | 7/1943 | Eklund | |
| 3,438,301 A | * | 4/1969 | Mattioli | |
| 5,248,231 A | * | 9/1993 | Denham | |
| 5,496,140 A | * | 3/1996 | Gossmann | |
| 5,645,383 A | * | 7/1997 | Williams | |

* cited by examiner

*Primary Examiner*—Flemming Saether
(74) *Attorney, Agent, or Firm*—Richard J. Veltman

(57) ABSTRACT

A blind rivet having a mandrel with a predetermined breakable stem disposed within a body with a bored shank. A radial flange is formed on one end of the shank to engage a workpiece and at the other end of the shank there is disposed within the shank an enlarged head of the stem the diameter of which is greater than the diameter of the bore of the shank. The breakneck of the stem formed with at least two series of radial impressions formed around the circumference of the shank at predetermined distances from the flange. Ribs are formed alternately between the radial impressions in the same horizontal series therewith.

8 Claims, 5 Drawing Sheets

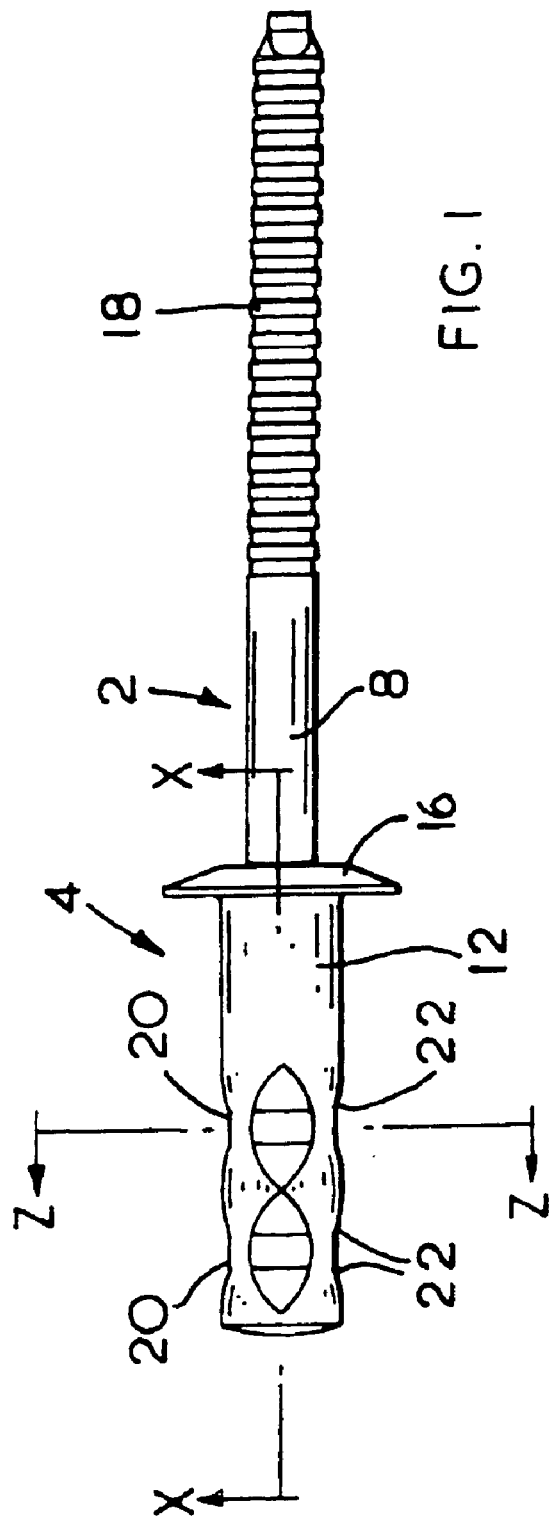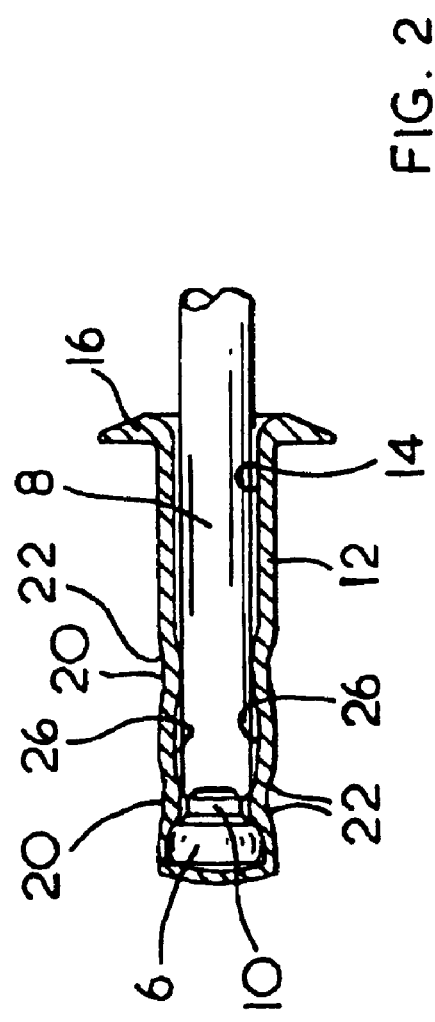

CLOSED-END BLIND RIVET WITH A CRIMPED SHANK AND METHOD OF MANUFACTURE THEREOF

RELATED U.S. APPLICATION DATA

This application is a continuation-in-part of U.S. application, Ser. No. 09/823,644, filed Nov. 27, 2000, now abandoned.

BACKGROUND OF THE INVENTION

This invention relates to a blind rivet and, more particularly, to a closed-end blind rivet with a crimped shank and method of manufacture thereof.

Blind rivets are well-known and generally comprise a mandrel having a pulling stem with a radially enlarged head attached at one end and a tubular shell having a generally cylindrical shaped shank having a radial flange formed at one end of the shank for engaging a face of the workpiece. An axial bore is formed through the flange and passes a substantial way into the shank. The radially enlarged head of the mandrel is located within the shank towards the end remote from the flange adjacent an end of the bore. The enlarged head has a circumference which is greater than that of the bore. The pulling stem extends from the enlarged head through the length of the bore and extends away from the body of the rivet. A breakneck is formed on part of the stem and which is located within the shank. When the rivet is set, the flange is held stationary whilst the exposed part of the pulling stem is pulled axially away from the flange, the enlarged head being forced to pass through at least part of the bore. Because the diameter of the pulling head is larger than the bore, it causes the shank to collapse, thus forming an annular bulge or fold which projects radially outwardly. The radial outward bulge forms a blind head and engages the blind side surface of the workpiece which is the opposite side of workpiece to that of the flange. Once the pulling force on the stem exceeds a predetermined amount, the breakneck breaks leaving the rivet set. The rest of the stem can then be removed and discarded.

One type of blind rivet comprises a shank having circumferential grooves spaced at intervals along the length of the shank. When such rivets are set, the grooves collapse in an axial direction, the sections of the rivet body between the grooves expanding radially to form the characteristic "cottage loaf" setting. The depth of the grooves is critical in certain extreme conditions for example when the rivet is set in an oversized hole whilst needing to provide an air and water tight fixing. This is particularly difficult when the rivet bodies are made of intractable material such as stainless steel, carbon steel or the like. If the grooves are too deep the rivet body will crack and if they are too shallow, the grooves will not provide sufficient resistance to prevent the mandrel head from pulling into or even through the rivet body.

This can result in two problems. Firstly, during setting in softer materials, the grooves are required to be deeper to prevent the mandrel head from pulling through the rivet body. However, this can cause fracture of the body. If the grooves are not at an optimum depth, the mandrel pulls through the body causing radial expansion of the rivet body between the grooves which can result in the splitting of the workpiece material if the expansion takes place within the bore formed in the workpiece, in which the rivet is located.

Secondly, if the grooves are less than optimum, during the setting of a rivet, the mandrel head can pull through the rivet body since there is insufficient resistance from the soft workpiece materials to help provide resistance to the head of the mandrel pulling into the rivet body. This can result in part of the stem attached to the head of the mandrel protruding from the flange giving a potentially hazardous condition.

The grooves or recesses can be formed by rolling, embossing or crimping. While the prior art patents have favored rolling or embossing, the present invention uses crimping to form the recesses or radial impressions that result in a positive leakproof setting of the blind rivet that is produced over an increased range of manufacturing tolerances than was possible in the prior art.

SUMMARY OF THE PRESENT INVENTION

Accordingly, in one aspect of the invention, there is provided a blind rivet comprising:

1. a body having a generally cylindrical shank, a radial flange formed at one end of the shank and a bore which extends axially through the flange and through at least part of the length of the shank; and
2. a mandrel comprising a mandrel head located adjacent an end of the bore remote from the flange, a stem attached to the mandrel head which passes through the length of the bore and extends beyond the flange and which comprises a breakneck located along the length of the stem; characterised in that there is provided a plurality of series of radial impressions which are crimped into the shank of the rivet at pre-set distances from the flange.

In one particular construction there is provided two series of radial impressions. Though there can be any number of radial impressions, in a preferred embodiment, there are four radial impressions in each series.

A first method of forming the radial impressions is by crimping. Angled flanks can be formed between adjacent radial impressions in each series. The shank will bulge outwardly between the series of radial impressions to form a gap between the stem and the wall of the bore in the body of the rivet between the series of radial impressions.

Though the body of the rivet can be made of many different types of material, preferably it is made from stainless steel.

According to a second aspect of the present invention there is provided a method of manufacturing a blind rivet comprising the steps of mounting the rivet body onto the mandrel so that the mandrel head is located within the shank, the stem extending from the head through the bore and flange and away from the body of the rivet, and then crimping a number of series of radial impressions onto the outer circumference of the shank at pre-set distances from the rivet body head.

According to a third aspect of the present invention, there is provided a method of setting a blind rivet in a workpiece comprising the step of selecting a rivet such that the series of radial impressions nearest the flange are located at a distance from the flange which is the same as the thickness of the workpiece so that when the rivet is located within the workpiece, the series of radial impressions nearest the flange coincides with the surface of the blind side of the workpiece.

Accordingly, it is an object of the present invention to provide a blind rivet with a crimped shank and method of manufacture thereof which overcomes the disadvantages of the prior art and provides for greater manufacturing tolerances and ease of production.

It is another object of the invention to provide a blind rivet and method of manufacture thereof which is relatively inexpensive, simple to produce and reliable in use in that its failure rate is de minimus and the product produced is leakproof.

BRIEF DESCRIPTION OF THE ACCOMPANYING DRAWINGS

Additional advantages and features of the present invention will become apparent from the subsequent description, taken in conjunction with the accompanying drawings wherein:

FIG. 1 shows a side view of a rivet according to the present invention;

FIG. 2 shows a vertical cross-section of the rivet indicated by X—X in FIG. 1;

DETAILED DESCRIPTION OF THE PREFERRED EMBODIMENTS

Figure 3:
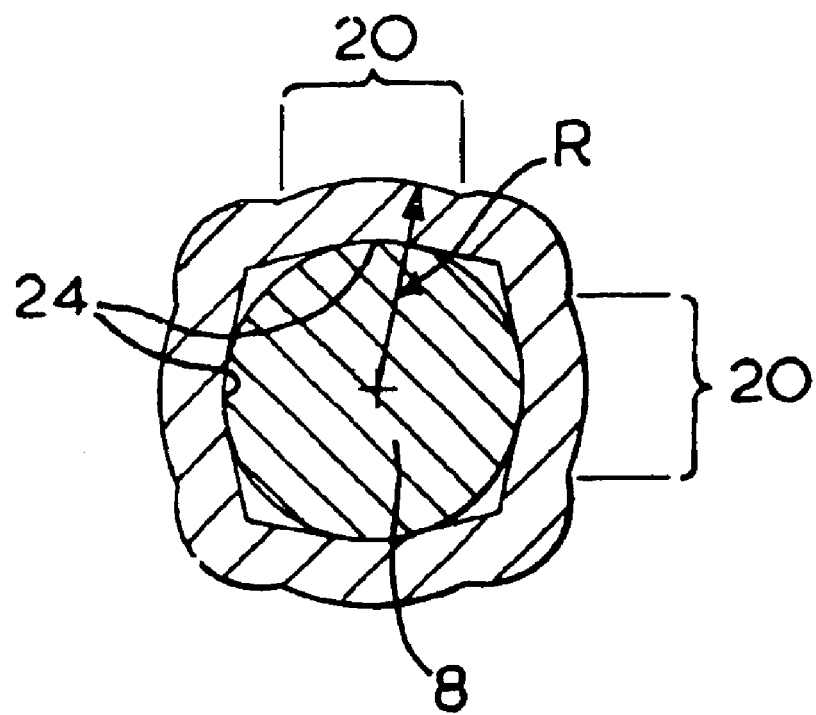
FIG. 3 shows a vertical cross-section of the rivet at the point indicated by Z—Z in FIG. 1.

With reference to the accompanying drawings, FIG. 1 shows a blind rivet having a mandrel (2) and a rivet body (4). The mandrel (2) has a mandrel head (6) attached to one end of a stem (8). The stem (8) comprises a breakneck (10) located adjacent the mandrel head (6). The diameter of the stem (8) is substantially uniform along the length of the stem (8).

The rivet body (4) has a tubular shank (12) having a flange (16) formed at one end of the shank (12). A bore (14), shown in FIG. 2, extends through the flange (16) and through a substantial part of the length of the shank (12). The head (6) of the mandrel (2) is located within the shank (12), the outer diameter of the head (6) being larger than the bore (14). The stem (8) of the mandrel (2) extends from the head (6) through the bore (14) and extends from the body (4) of the rivet away from the flange (16). Ridges (18), shown only in FIG. 1, are formed on part of the exposed end of the stem (8) to assist the rivet setting tool in gripping the stem in order to set the rivet. When the rivet is being manufactured, the shank (12) of the rivet initially has a substantially uniform diameter along its length. The bore (14) of the body (4) of the rivet has an internal diameter which is substantially equal to, or slightly larger than, that of the stem (8).

Figure 5:
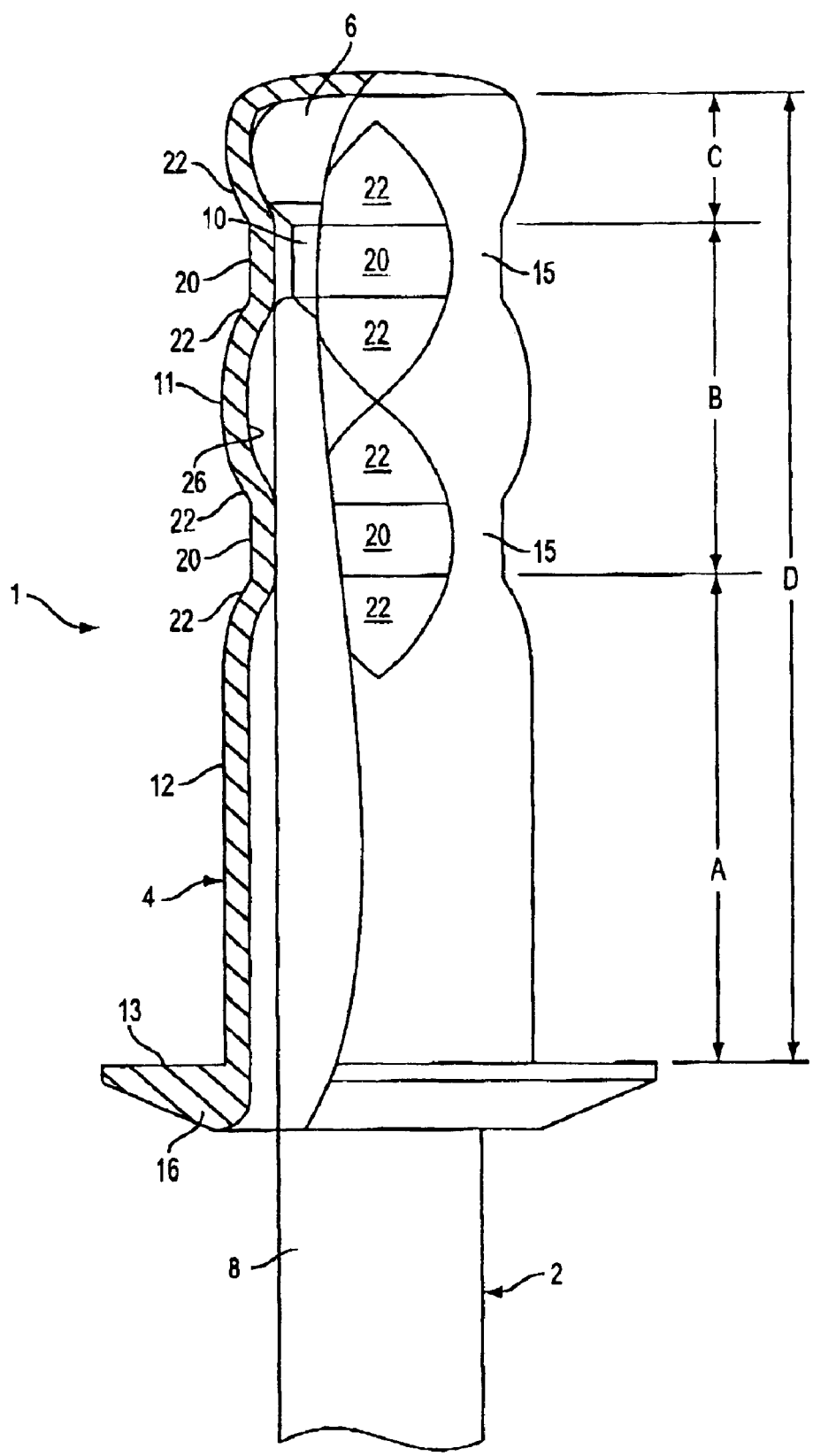
FIG. 5 shows a side view of the rivet, partly in section, according to the present invention to illustrate the axial spacing between the flange and the radial impressions ("A"), the two sets of radial impressions ("B") and the cap distance ("C")

Two series of radial impressions (20) have been crimped onto the rivet body (4) at pre-set axial distances from the flange (16), as described in greater detail hereinafter. In FIG. 5, the radial impression (20) is indicated by reference R and is best shown in FIG. 3. By crimping in this manner, the depth of the crimp is pre-set and the tolerances are controlled to produce a better and more dependable product that is both strong and leakproof. There are four radial impressions (20) in each of the upper and lower serieses. The crimping results in angled flanks (22) at either side of each radial impression (20) as shown best in FIG. 1 and FIG. 5. The radial impression (20) forces the shank (12) into a tight assembly with the mandrel at four positions (24) around the stem (8) at the same time inducing local work hardening of the rivet body (4) at these points.

During the crimping operation, some material is displaced inwardly to touch the mandrel but most is displaced longitudinally. The longitudinal displacement between the series of radial impressions results in an initial bulge (11) or a slight increase in diameter of the shank (12) between the series of radial impressions resulting in a gap (26) appearing between the stem (8) and the inside of the bore (14). This outward movement encourages the shank (12) to bend at the mid-point between the radial impressions (20) to cause the initial bulge (11).

FIG. 5 shows the relative axial distances A, B, C and D of the rivet body (4), in which:

"A" is the axial distance from the upper surface (13) of the flange (16) to the lower side of the lower series of radial impressions (20);

"B" is the axial distance from the lower side of the lower series of radial impressions (20) to the upper side of the upper series of radial impressions (20);

"C" is the axial distance from the upper side of the upper series of radial impressions (20) to the top of the head (6) which engages the under side of the closed end of the tubular shank (12); and "D" is the total axial distance from the top surface (13) of the flange (16) to the top of the head (6) or the total of A plus B plus C.

Figure 6:
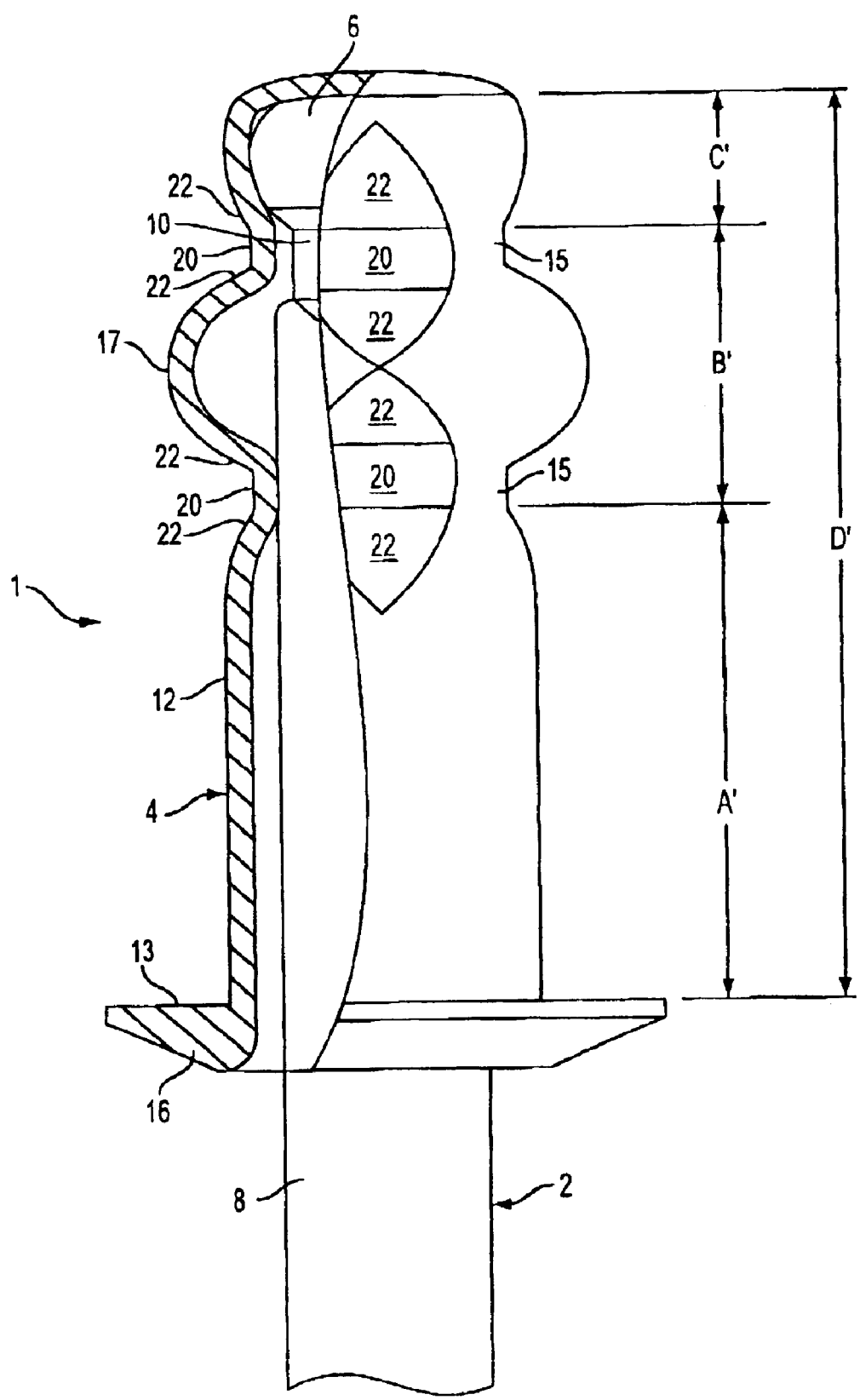
FIG. 6 shows the rivet of FIG. 5 in a partially set condition.
Figure 7:
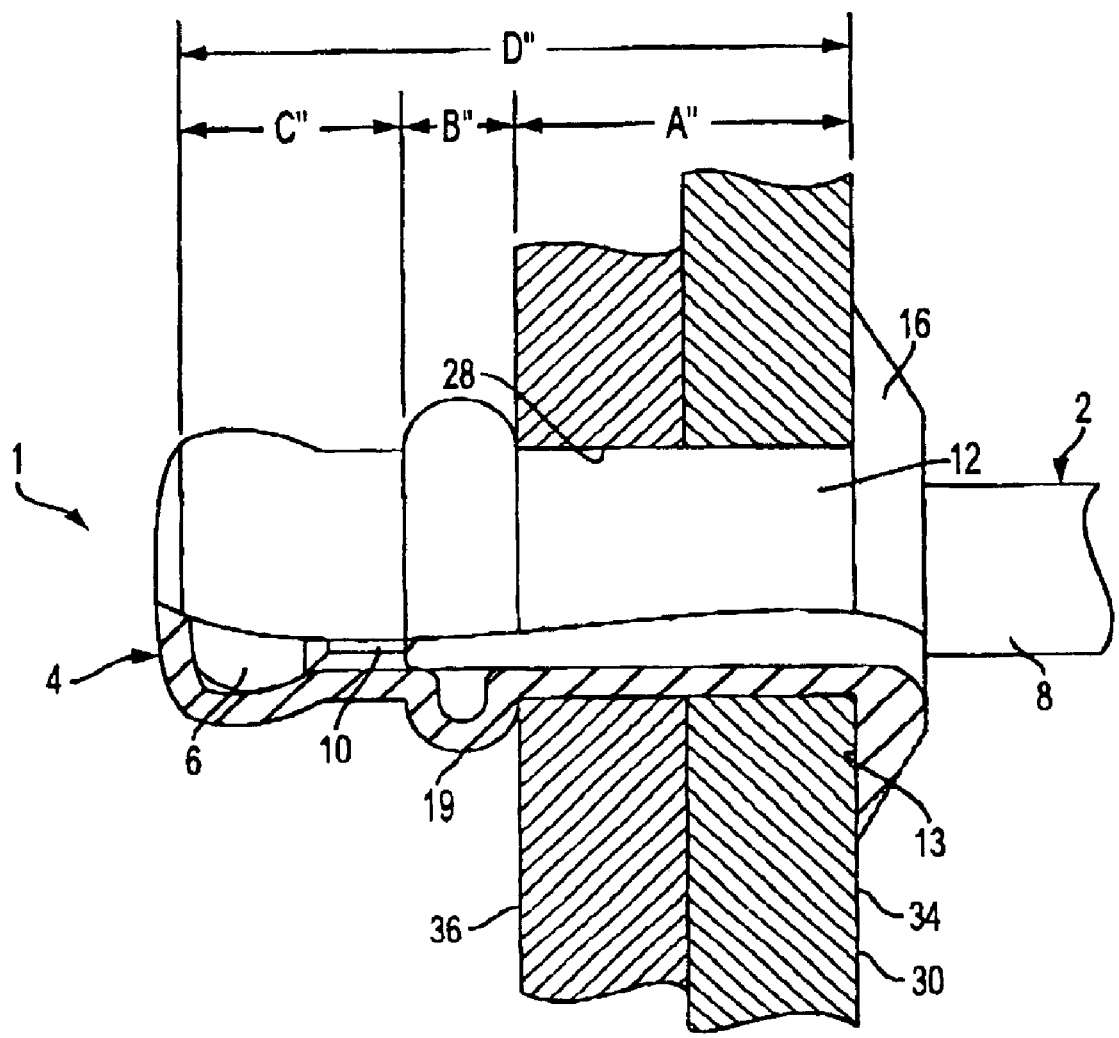
FIG. 7 shows the rivet of FIG. 5 when set.

Interposed in the horizontal plane between each of the adjacent radial impressions (20) are four areas, best shown in FIGS. 1 and 3, that are formed at both the upper series and the lower series of radial impressions (20), that define reinforcing ribs (15) that influence the collapse performance of the rivet body (4) or setting. The setting will occur, as shown in FIGS. 6 and 7, when the mandrel (2) is pulled to force the head (6) toward the workpiece (30). This places a load upon the cylindrical portion of the rivet body (4) and is supported by each series of the four crimped sections (20) and the four interposed reinforcing ribs (15). Though these members collapse, the collapse will be gradual because the ribs (15) act as struts. Furthermore, greater stability of the rivet body (4) collapse will occur since the setting load is being supported also by the four reinforcing ribs (15) that are at a greater distance from the axis of the rivet body.

In other words, in order to set the rivet, the shank (12) is placed into and through a bore (28) formed through a workpiece (30) so that the end of the shank (12) remote from the flange (16) protrudes from one side (36) of the workpiece (the blind side) and the flange (16) abuts against the other side (34) (the visible side). The series of radial impressions (20) and the ribs (15) nearest the flange (16) are located the same distance from the flange (16) as the thickness of the workpiece (30) so that, when the rivet body (4) is located within the workpiece, they are each aligned with the surface of the blind side (36). (See FIGS. 4 and 7.)

A rivet setting tool (not shown) of known design is used to set the rivet in the normal manner. The jaws of the rivet setting tool grip the part of the stem (8) which comprises ridges (18). The nose of the rivet setting tool abuts against the flange (16). As the rivet setting tool is operated to set the rivet, the stem (8) is axially pulled away from the flange (16) whilst the flange is held stationary to set the rivet.

In the initial stage of setting, the mandrel head (6) enters the rivet body (4) causing greater swelling in the region between the two series of radial impressions (20). As the shank (12) continues to collapse along the rivet body axis until, as shown in FIG. 6, an intermediate bulge (17) is formed. The work hardened ribs (15) adjacent the radial impressions (20) controls the collapse of the material in the bulge (11 or 17). The bulge (17) flattens out to form a final bulge (19), shown in FIGS. 4 and 7, while continuing to expand radially until the series of radial impressions (20)

furthest from the flange (16) has completely collapsed. At this stage, the lower part of the rivet body expands and by so doing fills the bore (28) of the workpiece (30). The amount of linear collapse is controlled by the position of the series of radial impressions (20) nearest the flange (16). The position of the radial impressions (20) nearest the flange (16) determines the minimum thickness of the workpiece (30) which can be fastened using the rivet (1).

Figure 4:
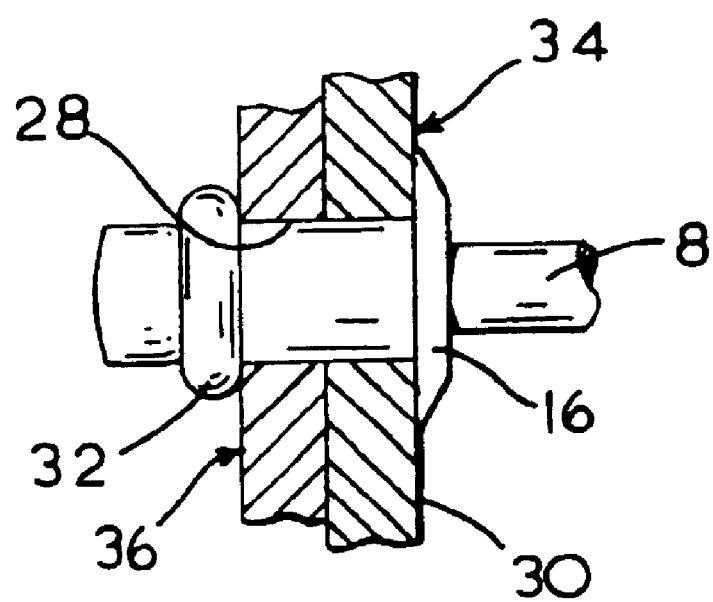
FIG. 4 shows the rivet after it has been set.

FIGS. 4 and 7 show the rivet (1) after it has been fully set. At this point, both series of radial impressions (20) and the ribs (15) have collapsed totally and thus effectively stopped any further linear collapse of a rivet body (4). The mandrel breaks at the breakneck (10) (not shown), while the mandrel head (6) is retained within the rivet body (4).

FIG. 6 illustrates the intermediate bulge (17) of the rivet body (4), wherein B' is substantially equal to one-half (½) of B; A' will be substantially equal to A; and C' will be substantially equal to C. Therefore, D' equals A' plus B' plus C' or A plus one-half (½) of B plus C.

Likewise, FIG. 7 illustrates the final bulge (19) of the rivet body (4), wherein B" is substantially equal to one-third (⅓) of B; A" will be substantially equal to A; and C" will be substantially equal to C. Therefore, D" equals A" plus B" plus C" or A plus one-third (⅓) of B plus C.

Some prior art patents reduce the diameter of the rivet shank so that insertion of the rivet into a multiple sheet workpiece could result in the rivet body being located in a crimped gap. The result would be to make further insertion in the workpiece hole difficult. In the present invention, the ribs (15) prevent sheet material from the workpiece from entering the crimped areas, thus insertion is always easier to achieve and reliable.

Also, the reinforcing ribs (15) greatly enhance the present invention in filling oversize holes, because the shank is and remains at its designed diameter or slightly larger so that upon collapse there is a corresponding increase in diameter that is deemed excellent in filling even oversize holes.

In general, the above-identified embodiments are not to be construed as limiting the breadth of the present invention. It is understood that other modifications or other alternative constructions will be apparent which are within the scope of the invention as defined in the appended claims.

What is claimed is:

1. A blind rivet to be mounted in a hole of a workpiece comprising:
   a. a rivet body having a cylindrical shank, closed at the top end and open at the opposite end with an external flange formed at the open end thereof;
   b. a mandrel disposed in the rivet body and having a stem extending outwardly therefrom to terminate in an axially ridged portion at the end thereof remote from the rivet body;
   c. the mandrel having a head clampingly disposed adjacent the closed end of the rivet body;
   d. a breakneck formed on the stem adjacent the head thereof;
   e. the rivet body has a first series of radial impressions crimped outwardly of the breakneck; and
   f. the rivet body has a second series of radial impressions crimped at a predetermined axial distance from the first radial impressions to form a radial gap between the rivet body and the stem of the mandrel to define a bent portion between the first crimp and the second crimp of the rivet body the bent portion having a constantly varying diameter between the first and second impressions.

2. A blind rivet as claimed in claim 1 wherein the rivet body is made from stainless steel.

3. The blind rivet claimed in claim 1 wherein:
   a. a bulge in the rivet body is formed between the first radial impression and the second radial impression.

4. The blind rivet claimed in claim 3 wherein:
   a. the bulge collapses upon the mandrel stem being pulled from the rivet body.

5. The blind rivet claimed in claim 1 wherein:
   a. "B" is the axial distance from the first radial impression to the second radial impression; and
   b. One-third (⅓) of "B" is the substantial radial distance between the first radial impression and the second radial impression.

6. The blind rivet claimed in claim 5 wherein:
   a. "C" is the axial distance from the first radial impression to the closed top end of the rivet body; and
   b. "C" is normally smaller than "B" before the rivet is set.

7. The blind rivet claimed in claim 6 wherein:
   a. "C" is larger than "B" after the rivet is set.

8. A method of forming a blind rivet to be connected in the hole of a workpiece comprising the steps of:
   a. providing a blind rivet having a rivet body formed of a tubular shank having a dosed end on one side and a flange end at the other side with a bore extending therethrough from the flange side toward the closed end;
   b. entrapping a mandrel having an enlarged head with the enlarged head end adjacent the closed end of the rivet body with the mandrel extending outwardly of the flange side or the rivet body.
   c. crimping the rivet body adjacent the closed end thereof with a plurality of circumferentially spaced radial impressions in two series of axially spaced locations with a predetermined distance between the lower series of crimping and the flange side, the rivet body having a constantly varying diameter between the first and second impressions;
   d. forming a plurality of ribs in each series lying between adjacent radial impressions.

* * * * *